(12) United States Patent
Mazzouji et al.

(10) Patent No.: US 8,894,366 B2
(45) Date of Patent: Nov. 25, 2014

(54) FRANCIS-TYPE HYDRAULIC TURBINE WHEEL EQUIPPED WITH A TIP-FORMING MEMBER, AND METHOD OF REDUCING FLUCTUATIONS USING SUCH A WHEEL

(75) Inventors: Farid Mazzouji, Vourey (FR); Danièle Bazin, Voiron (FR); Michel Couston, Seyssins (FR); Claude Beral, Veurey Voroize (FR); Jacques Bremond, Saint Egreve (FR)

(73) Assignee: Alstom Renewable Technologies, Grenoble (FR)

( * ) Notice: Subject to any disclaimer, the term of this patent is extended or adjusted under 35 U.S.C. 154(b) by 770 days.

(21) Appl. No.: 12/920,342

(22) PCT Filed: Mar. 4, 2009

(86) PCT No.: PCT/FR2009/050348
§ 371 (c)(1),
(2), (4) Date: Jan. 21, 2011

(87) PCT Pub. No.: WO2009/115729
PCT Pub. Date: Sep. 24, 2009

(65) Prior Publication Data
US 2011/0103951 A1 May 5, 2011

(30) Foreign Application Priority Data
Mar. 5, 2008 (FR) .................................... 08 51430

(51) Int. Cl.
F03B 15/02 (2006.01)
F03B 11/04 (2006.01)
F03B 3/02 (2006.01)
F03B 3/12 (2006.01)
F03B 3/10 (2006.01)

(52) U.S. Cl.
CPC ............... *F03B 3/02* (2013.01); *F05B 2250/25* (2013.01); *F03B 11/04* (2013.01); *Y02E 10/223* (2013.01); *F03B 3/125* (2013.01); *F03B 3/103* (2013.01); *F05B 2240/242* (2013.01); *Y02E 10/226* (2013.01)
USPC .................................. 416/1; 416/91; 416/189

(58) Field of Classification Search
CPC ............ F03B 3/02; F03B 3/103; F03B 3/125; F03B 11/04; F05B 2240/242; Y02E 10/223; Y02E 10/226
USPC ........... 415/28, 36, 37, 39, 91, 144, 145, 146; 416/90 R, 91, 90 A, 93 R, 94, 189, 416/201 R, 201 A, 198 A, 203, 245 R, 146 R, 416/1
See application file for complete search history.

(56) References Cited

U.S. PATENT DOCUMENTS 1,482,292 A * 1/1924 Felthousen .................... 415/145
1,744,555 A * 1/1930 Kitchens ....................... 415/166
(Continued)

FOREIGN PATENT DOCUMENTS

FR 1162872 9/1958
FR 1203142 1/1960
(Continued)

OTHER PUBLICATIONS
Machine Translation of FR 1203142.*
(Continued)

*Primary Examiner* — Edward Look
*Assistant Examiner* — Wayne A Lambert
(74) *Attorney, Agent, or Firm* — Buchanan Ingersoll & Rooney PC

(57) ABSTRACT

This wheel comprises a plurality of vanes (2) arranged on a crown (3) and is equipped with a tip-forming member (10) attached to a central region (32) of the crown or hub of the wheel (1), radially inside the vanes (2), the crown defining a wet surface (31) for guiding a flow (E) passing between the vanes. The tip-forming member (10) is provided with at least one opening (121) for diverting a fraction ($E_1$) of the flow towards the internal volume ($V_{10}$) of this member. This member comprises a frustoconical annular skirt (11) and at least one fin (15) arranged in its internal volume ($V_{10}$) and able to modify the path of the flow fraction ($E_1$) entering this volume through the opening (121). This fin (15) extends as far as the edge (112) of the skirt (11) which defines an outlet opening (14) of the member (10) for the flow fraction ($E_1$).

19 Claims, 6 Drawing Sheets

(56) References Cited

U.S. PATENT DOCUMENTS

| | | | | |
|---|---|---|---|---|
| 1,907,466 A | * | 5/1933 | Terry | 415/48 |
| 1,950,777 A | * | 3/1934 | Biggs | 415/144 |
| 2,079,258 A | * | 5/1937 | Kerr | 415/117 |
| 2,507,796 A | | 5/1950 | Martin | |
| 2,758,815 A | * | 8/1956 | Elie Fontaine et al. | 415/168.2 |
| 2,778,563 A | * | 1/1957 | Doyle | 415/146 |
| 3,249,340 A | * | 5/1966 | Pinto | 366/261 |
| 3,738,773 A | * | 6/1973 | Tinker | 416/179 |
| 3,807,444 A | * | 4/1974 | Fortune | 137/512.1 |
| 3,874,819 A | * | 4/1975 | Tamura et al. | 416/186 R |
| 4,073,595 A | * | 2/1978 | Schiele et al. | 415/143 |
| 4,147,465 A | * | 4/1979 | Schiele et al. | 415/143 |
| 4,958,986 A | * | 9/1990 | Boussuges | 415/188 |
| 5,261,787 A | * | 11/1993 | Morgunov | 415/208.1 |
| 7,100,623 B2 | * | 9/2006 | Assmann et al. | 134/184 |

FOREIGN PATENT DOCUMENTS

| | | |
|---|---|---|
| FR | 2300909 | 9/1976 |
| JP | 55-64472 | 5/1980 |
| JP | 04072468 | 3/1992 |

OTHER PUBLICATIONS

Official Translation of JP 04072468.*

* cited by examiner

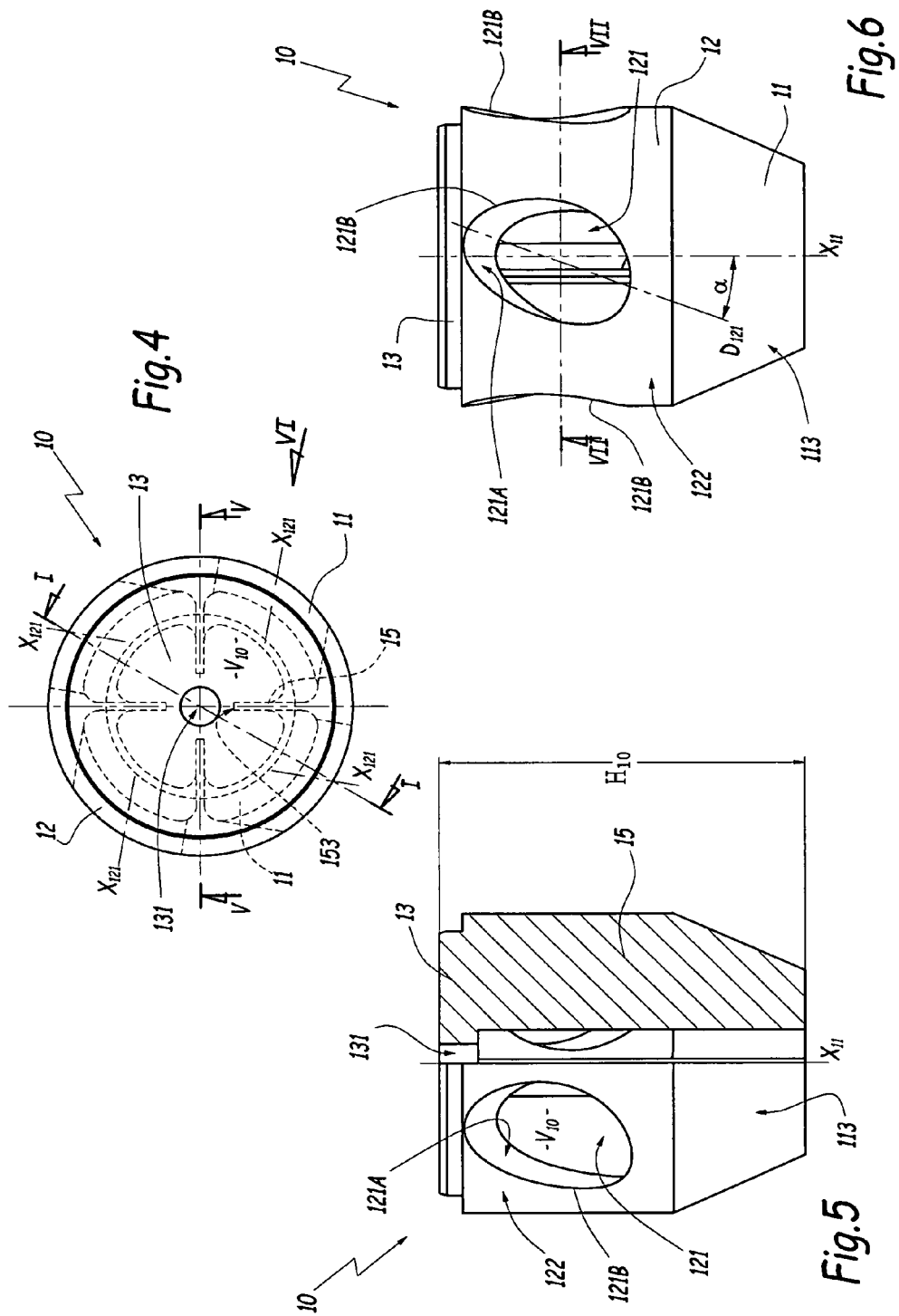

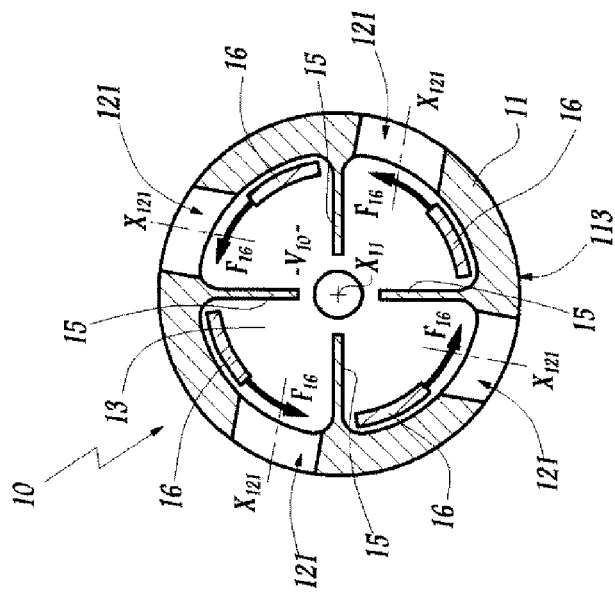
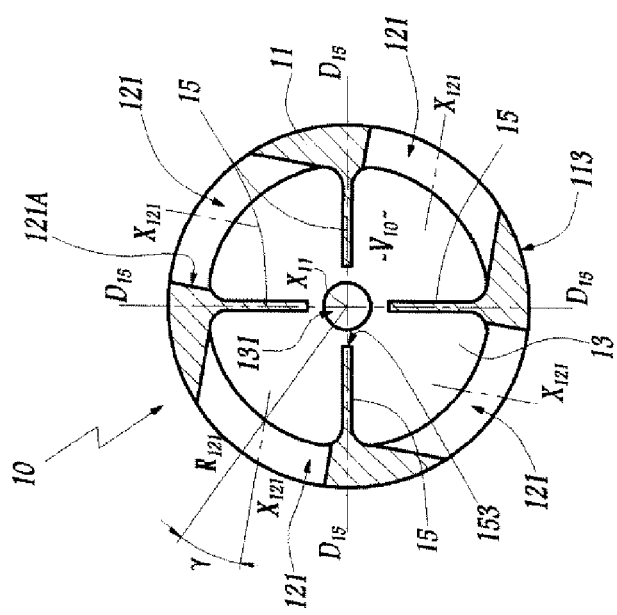

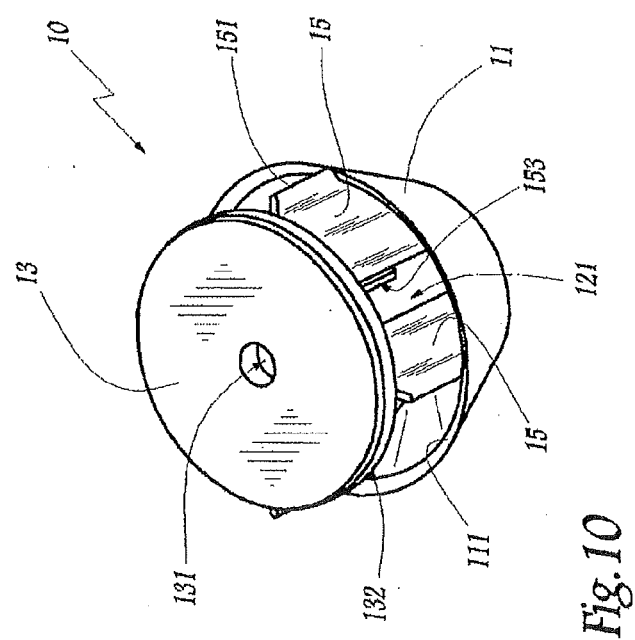
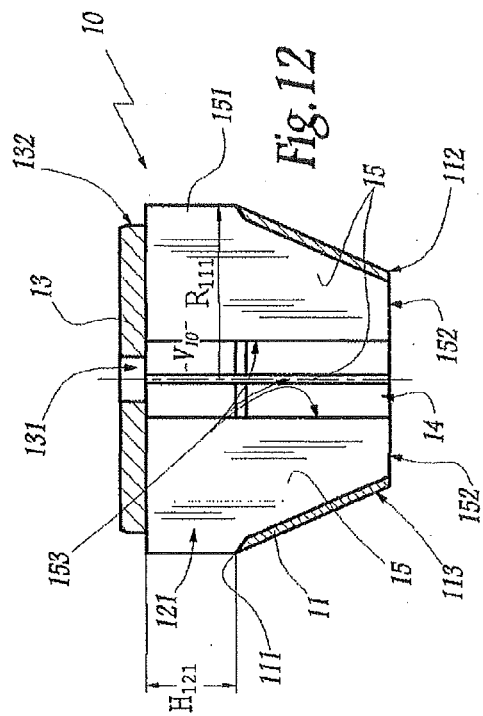
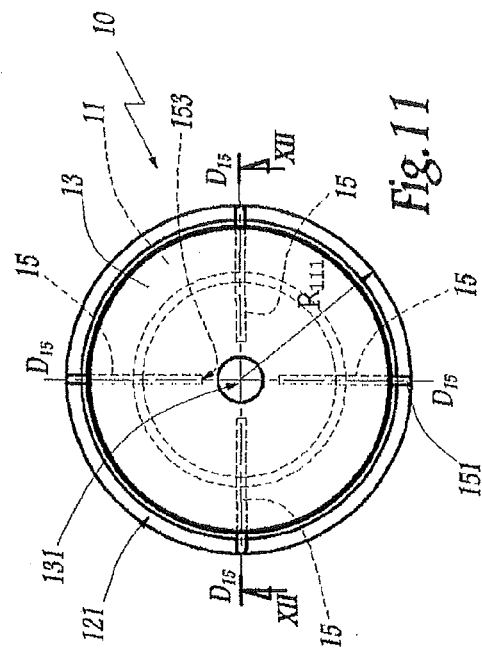

FRANCIS-TYPE HYDRAULIC TURBINE WHEEL EQUIPPED WITH A TIP-FORMING MEMBER, AND METHOD OF REDUCING FLUCTUATIONS USING SUCH A WHEEL

BACKGROUND OF THE INVENTION

1. Field of the Invention

The present invention relates to a Francis-type wheel of a hydraulic machine equipped with a tip-forming member which in the main extends the crown of the wheel. The invention also relates to a method of reducing the fluctuations in a flow interacting with such a wheel.

2. Brief Description of the Related Art

Previously disclosed in the field of hydraulic turbines, in particular Francis-type turbines, is the equipment of the downstream region of the crown of a wheel with an axisymmetric member, often referred to as a "tip", the external surface of which substantially extends the wetted surface of the crown of the wheel having a diameter which may reduce in the downstream direction. This member or "tip" extends the guiding of the flow into proximity with the axis of rotation of the wheel. Similarly previously disclosed is the use of guiding members or tips in turbine pumps and other paddle turbines.

In previously disclosed hydraulic turbines, the flow crossing the wheel may give rise to eddies or turbulence phenomena, commonly referred to as "torches", which, under certain loadings, are in the form of a "corkscrew". These turbulence phenomena in the form of a torch are troublesome to the extent that they cause fluctuations in pressure and/or power which can adversely affect the stability of the network that is fed by the machine as well as the mechanical outputs of this machine.

Previously disclosed in WO-A-2005/038243 is the use of a tip comprising two surfaces, respectively convergent and divergent in the direction of an axis of rotation of the wheel, which permits the turbulence phenomena to be limited to a large degree. Turbulence phenomena remain present at certain speeds, however, and the present invention proposes an alternative solution permitting these turbulence phenomena to be eliminated or greatly reduced.

Also previously disclosed in U.S. Pat. No. 2,758,815 is the arrangement of small-diameter bores in the form of a tip to permit recirculation, inside the tip of a Francis-type wheel, from the bottom towards the top, for a Francis-type wheel having a vertical axis. A quantity of water exits from the tip via these openings in such a way as to constitute jets deflected towards the downstream direction by the principal flow passing though the turbine in order to form around the tip a mixed flow zone which constitutes a current ring surrounding the meridian region of the tip. This type of function is not always effective to the extent that the "pumping" effect due to the tip cannot be guaranteed.

Also previously disclosed in FR-A-1 162 872 is the arrangement of a cylindrical tube below a tip of a conical wheel without knowing precisely how the water circulates inside and around this tube. This tube is intended to guide the water after its passage inside the wheel, in such a way that it is caused to extend for a considerable height inside the suction conduit of the installation. The tube limits the output volume of the principal flow as it leaves the wheel, which increases the speed of this flow and, as a consequence, the output losses. Ribs connect the tube mechanically to the conical tip, but without their influence on the path of the flow being quantified. In addition, the tube suspended at the tip substantially increases the overall size of the wheel, which presents difficulties for the installation of the wheel at its place of use.

SUMMARY OF THE INVENTION

The present invention is intended more particularly to address these disadvantages by proposing a new Francis-type wheel, with which a turbine or a turbine pump can be equipped, and in which turbulence phenomena at the outlet from the turbine are minimized and the output losses are not increased as a result of the use of this member.

To this end, the invention relates to a Francis-type wheel for a turbine or a hydraulic turbine pump, the wheel comprising a plurality of vanes arranged on a crown and being equipped with a tip-forming member attached to a central region of the crown or hub of the wheel, radially inside the vanes, the crown defining a wet surface for guiding a flow passing between the vanes, and the tip-forming member being provided with at least one opening for diverting a fraction of the flow which passes between the vanes towards the internal volume of this member. This wheel is characterized in that the tip-forming member comprises an annular skirt in the form of a truncated cone which encloses the internal volume of the member, towards which the fraction of the flow is diverted, and in that at least one fin arranged inside the internal volume of the member and extending as far as the edge of the skirt delimiting an outlet opening in the member for the fraction of the flow that is diverted towards the internal volume is able to modify the path of the flow fraction entering this internal volume through the one or more openings for diverting the flow.

Thanks to the invention, it is possible to direct a fraction of the flow via the opening for diverting the flow, which fraction interacts with the wheel towards the interior of the member or the tip, thereby permitting this fraction of the flow to be redirected towards a central zone of the turbine, inside which torches or turbulence phenomena exhibit a tendency to form. In other words, when mounted on a Francis-type turbine wheel, the tip-forming member permits a quantity of water that is not traveling at the same speed as the principal flow to be injected into a central zone of the machine, this injection making it possible to "fill" the zone in which turbulence phenomena exhibit a tendency to develop. The one or more fins effectively modify the path of the fraction of the flow which penetrates into the internal volume of the member by continuing to act upon the latter as far as the immediate vicinity of the outlet opening, because these fins extend as far as the lower edge of the skirt which delimits this opening. The combined action of the fins and the skirt on this fraction of the flow permits the height of the skirt, when observed parallel to the axis of rotation of the wheel, to be relatively low to the point at which the member is unable to extend beyond the lower edge of the belt of the wheel inside the suction tube. The principal flow of water is not disrupted to a significant extent, however, and the output of the turbine is not decreased to an inconvenient extent. The geometry of the member also ensures that the secondary flow exiting from this member can be substantially axial and acts effectively on the turbulence phenomena or the eddies that exhibit a tendency to form in the vicinity of the axis or rotation of the wheel, downstream thereof.

According to advantageous, although not mandatory, aspects, a wheel according to the invention may incorporate one or more of the characterizing features of Claims 2 to 19, taken in any technical permissible combination.

The invention finally relates to a method of reducing fluctuations in a flow which interacts with a wheel of a hydraulic machine. According to this method, a fraction of this flow is caused to penetrate into the internal volume of a tip-forming member belonging to a wheel as described above via the one or more aforementioned openings for diverting the flow, the path of the fraction of the flow being modified by means of the fins of the member, and this fraction of the flow being caused to exit from this member via an axial opening such that this fraction of the flow is directed, as it exits from this member, to the inside of an in the main cylindrical volume having an axis parallel to an axis of rotation of the wheel.

BRIEF DESCRIPTION OF THE DRAWINGS

The invention will be better understood, and its other associated advantages will become clearer, in light of the following description of four embodiments of a member according to the invention and two embodiments of a Francis-type wheel according to the invention, which are given only by way of example and are made with reference to the accompanying drawings, in which:

FIG. 4 is a top, on a smaller scale, of the tip depicted in FIGS. 2 and 3, in which the line I-I represents the sectional plane of the tip in FIG. 1;

FIG. 5 is a half-section along section V-V in FIG. 4;

FIG. 6 is a view in the direction of the arrow VI in FIG. 4;

FIG. 7 is a section along the line VII-VII in FIG. 6;

FIG. 8 is a similar section to that in FIG. 7 for a tip according to a second embodiment;

FIG. 10 is a perspective view of the tip of the wheel depicted in FIG. 9;

FIG. 11 is a top view of the member depicted in FIG. 10; and

FIG. 12 is a section along the line XII-XII in FIG. 11.

DESCRIPTION OF THE PREFERRED EMBODIMENTS

Figure 1:
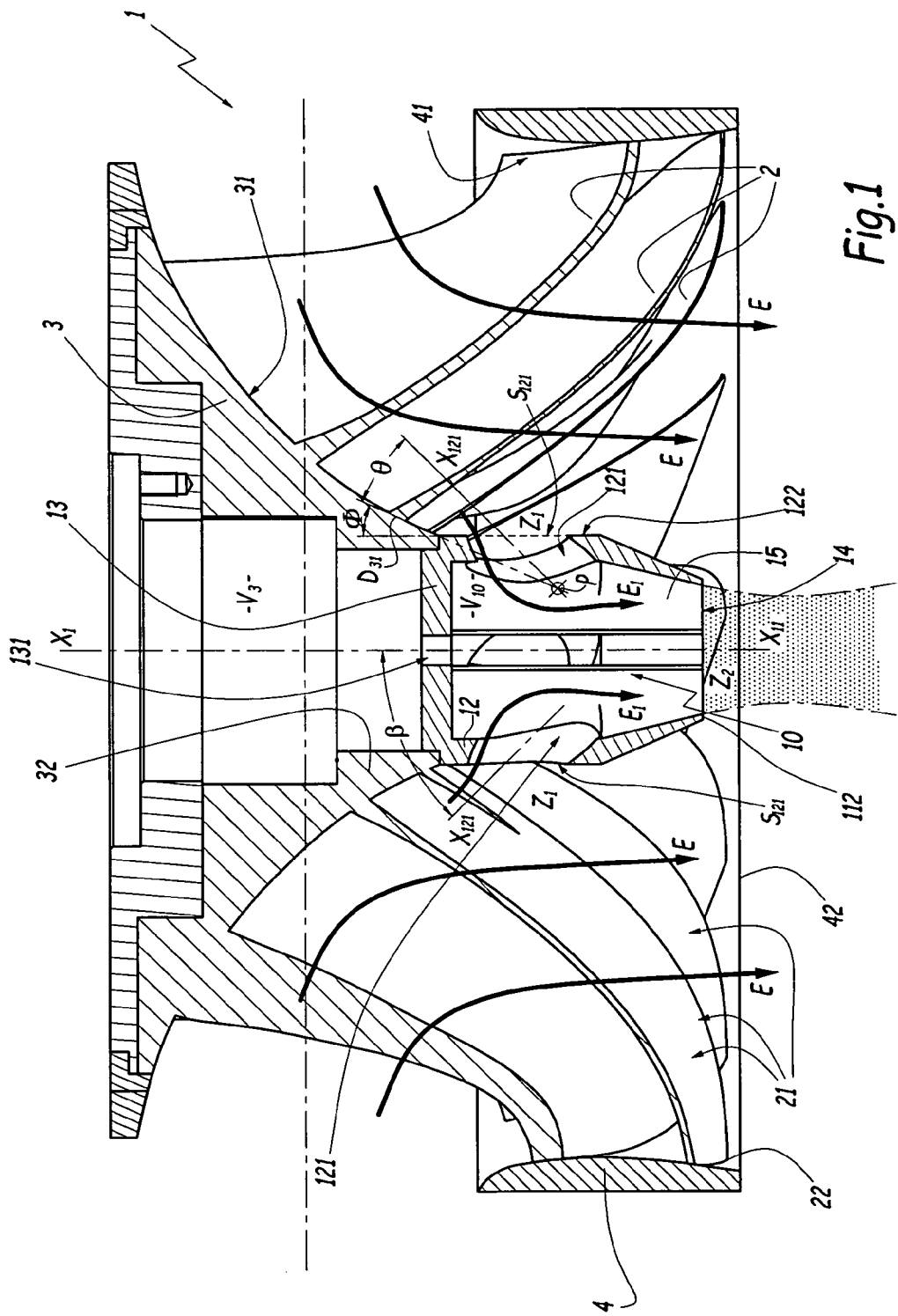
FIG. 1 is an axial section of a turbine wheel according to the invention.
Figure 2:
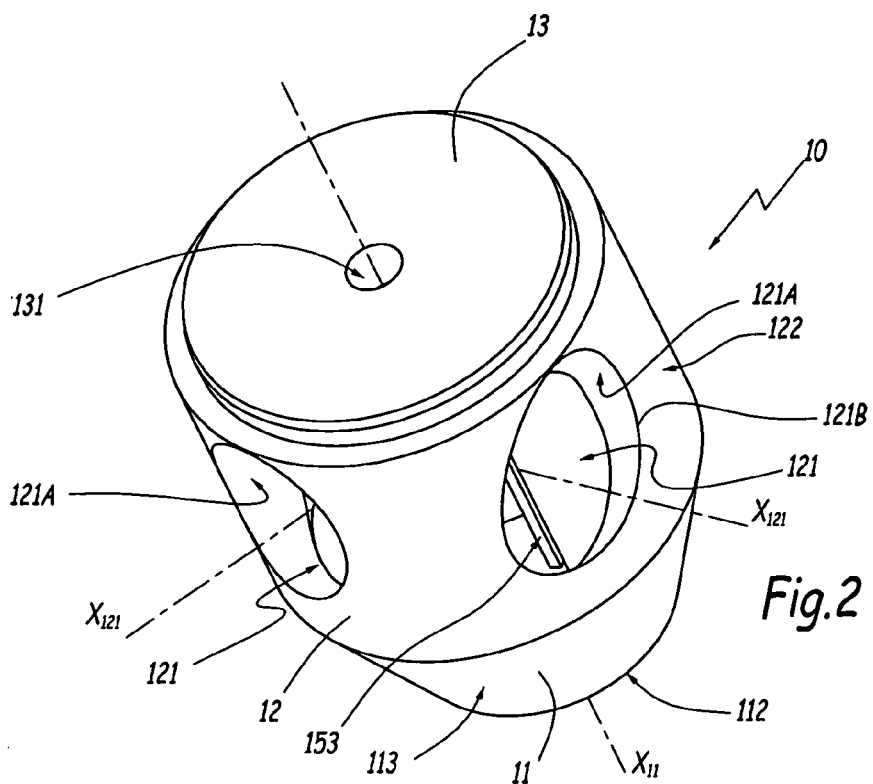
FIG. 2 is a perspective view, on a larger scale, of the tip of the wheel depicted in FIG. 1.
Figure 3:
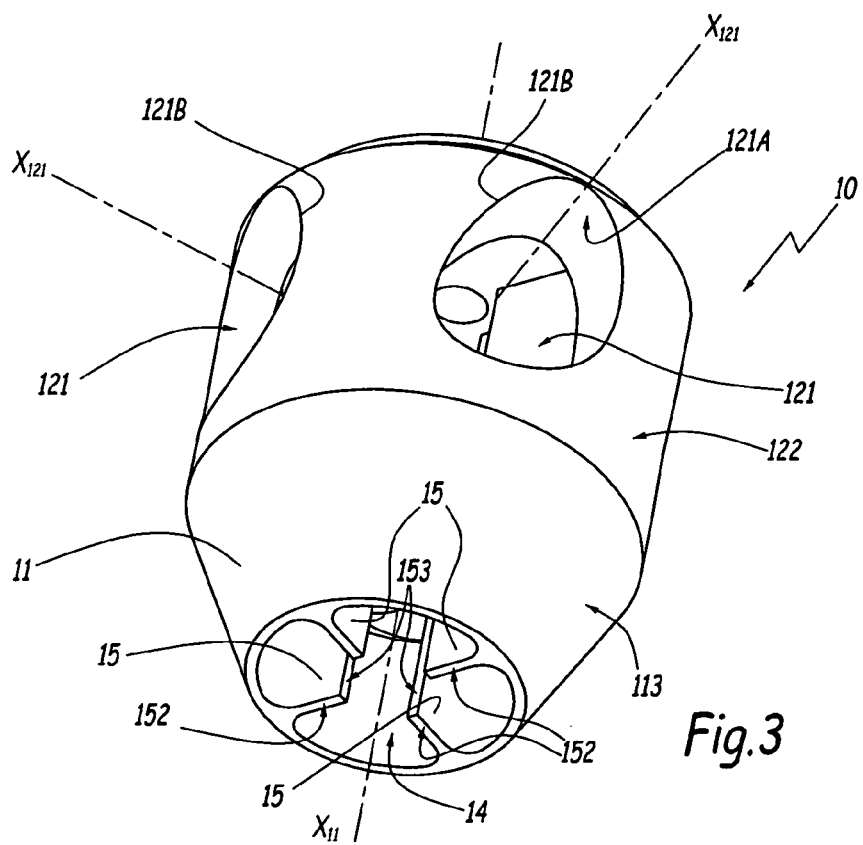
FIG. 3 is a perspective view of the tip depicted in FIG. 2, viewed from a different angle.

The Francis-type turbine wheel 1 depicted in FIG. 1 comprises vanes 2 evenly spaced around a central axis $X_1$ of rotation of the wheel 1. A crown 3 is provided on the internal upper and radial part of the wheel 1, while a belt 4 borders on the external lower and radial parts of the vanes 2. A flow conduit is created between each pair of two adjacent vanes 2, this conduit being delimited by a wet surface 31 of the crown 3 and by a wet surface 41 of the belt 4. A flow E can thus pass through the wheel 1 so as to cause it to rotate about the axis $X_1$ by acting on the vanes 2 of the wheel for the purpose of driving a shaft, not illustrated here, connecting the wheel 1 to an energy conversion device such as an alternator, also not illustrated.

A member 10 forming a "tip" is mounted on the downstream region 32 of the crown 3. This member partially shuts off the downstream access to the internal volume $V_3$ of this crown 3, this volume generally being required to remain accessible, before placing the member 10 in position, for mounting the wheel 1 and in particular for its attachment to the aforementioned shaft.

The member or tip 10 comprises a skirt 11 centered on an axis $X_{11}$ which itself constitutes a central axis of the member 10. The axes $X_1$ and $X_{11}$ are coincident when the tip 10 is mounted on the wheel 1. In practice, the skirt 11 is frustoconical and is at revolution symmetry about the axis $X_{11}$.

In this description, the expressions "high" and "low", "upper" and "lower" correspond to the orientation of the parts of the wheel 1 when this is configuration for use in a turbine or a turbine pump with a vertical axis. Thus, an "upper" part is situated above a "lower" part.

The skirt 11 extends upwards through a cylindrical wall 12 of circular cross section adjacent to a ceiling 13, which closes off the interior volume $V_{10}$ of the tip 10 in the upward direction. The elements 11, 12 and 13 are cast in a single piece and are executed in metal, for example in steel, or in a composite material.

Alternatively, the wall 12 could be conical and convergent or divergent towards the base.

The ceiling 13 is pierced by an opening 131 permitting the passage of a fixing means that is not illustrated on the crown 3 of the wheel 1. This fixing means is advantageously in the form of a bolt or equivalent. According to one aspect of the invention, which is not illustrated here, the ceiling 13 may be pierced by one or more orifices for the passage of air or for access to the bolts for attaching the wheel 1 to its shaft.

The wall 12 is pierced by four openings 121, which permit a fraction of the flow E to be diverted towards the internal volume $V_{10}$ of the tip 10. Evident at 121A is the edge of an opening 121, and at 121B the edge of the junction between this edge and the external radial surface 122 of the wall 12. The edge 121A is defined by the intersection of the wall 12 and an imaginary cylinder. Alternatively, this edge 121A may be defined by the intersection of the wall 12 with an imaginary cone.

Evident at $X_{121}$ is the central axis of an opening 121, that is to say an axis passing through the geometrical barycenter of the edge 121B and oriented parallel to the axis of the cylinder or of the trunk of the aforementioned imaginary cone.

Evident at $S_{121}$ is the entrance region of an opening 121 which is delimited by the edge 121B. This entrance region is arranged in the external radial surface 122 of the wall 12. The path of the entrance region $S_{121}$ of the opening 121 on the right of FIG. 1 is represented in this figure by a straight dotted line.

Also evident at $D_{31}$ is a straight line in the plane of FIG. 1, which extends the wet surface 31 in the direction of the axis $X_1$, that is to say in the downstream direction when the wheel is functioning as part of a turbine. The straight line $D_{31}$ is tangent to the surface 31 in the vicinity of the downstream region 32 of the crown 3.

Evident at $\theta$ is the angle between the straight line $D_{31}$ and the meridian projection of the central axis $X_{121}$ in the plane of FIG. 1. The angle $\theta$ is measured in the angular sector delimited by the straight line $D_{31}$ and the path of the axis $X_{121}$ in FIG. 1 radially outside a point of intersection P between this straight line and this path, in relation to the axis $X_1$.

This angle $\theta$ is acute, in the sense that it has a value strictly less than 90°. In practice, the angle $\theta$ has a value less than 80°, and preferably less than 60°. Satisfactory results have been obtained with an angle $\theta$ equal to about 25°.

Thanks to the position and the orientation of the central axes $X_{121}$ of the openings 121 in relation to the straight line $D_{31}$, a fraction of the flow E which moves along the wet surface 31 naturally flows towards the interior volume $V_{10}$ of the member 10.

The external radial surface 122 of the wall is not parallel to the straight line $D_{31}$ depicted in FIG. 1, with the result that the path of the entrance region $S_{121}$ of an opening 121 in the plane of FIG. 1 forms a nonzero angle $\phi$ with the straight line $D_{31}$.

Taking into account the value of the angles θ and φ, the entrance region $S_{121}$ of each opening 121 is present on the path of a fraction of the flow E which licks the surface 31, in such a way that the diversion of a fraction of this flow E, in the form of a secondary flow $E_1$ towards the volume $V_{10}$, is facilitated and that, by so doing, the rate of the flow $E_1$ can be significant.

The openings 121 thus constitute openings for diverting a fraction of the flow E in the form of the secondary flow $E_1$ towards the volume $V_{10}$.

The secondary flow $E_1$ is taken from the flow E downstream of the trailing edge 21 of the vanes 2, in such a way that this flow $E_1$ can be regarded as having already contributed to the rotation of the wheel 1 by interaction with the vanes 2. In other words, the fact that the flow $E_1$ passes into the volume $V_{10}$ does not diminish the overall output of the wheel 1.

The free edge 112 of the skirt 11 opposite the ceiling 13 delimits an outlet opening 14 from the member 10, which can be described as "axial" in the sense that it is centered on the axis $X_{11}$, so that a flow which crosses it perpendicularly is parallel in the main to this axis. The opening 14 is in the form of a disc perpendicular to the axis $X_{11}$.

The opening 14 could be "radial" in part, in the sense that a flow which were to cross it would also possess a radial component.

The interior volume $V_{10}$ of the member 10 is the internal radial volume of the skirt 11 that is closed off, towards the top, by the ceiling 13 and is delimited on its side edge 112 by the opening 14.

Arranged inside the volume $V_{10}$ are four fins 15 evenly spaced around the axis $X_{11}$. Each fin 15 is planar and is arranged, inside the volume $V_{10}$, in a radial plane relative to the axis $X_1$. In other words, in the representation in FIGS. 4 and 7, each fin 15 extends in the main in a radial direction $D_{15}$ relative to the axis $X_{11}$.

Each fin 15 connects the skirt 11 to the ceiling 13 passing radially inside the wall 12.

Each fin 15 extends from the ceiling 13 as far as the edge 112, where it is terminated by a rectilinear trailing edge 152 that is rectilinear and perpendicular to the axis $X_{11}$. This edge extends from the edge 112 in the direction of the axis $X_{11}$, that is to say the axis $X_1$ when the member 10 is mounted on the wheel.

Each fin 15 extends from the skirt 11 and from the wall 12 and in the direction of the axis $X_{11}$ as far as an edge 153 that is rectilinear and parallel to the axis $X_{11}$. The edges 153 of the different fins 15 are distant one from the other in such a way that a zone without a member for diverting the secondary flow $E_1$ is arranged at the center of the volume $V_{10}$.

The fins 15 are the only members that affect the flow $E_1$ in the interior of the volume $V_{10}$. In particular, there is no conical or circular part occupying a central zone of the volume $V_{10}$, which also permits the flow $E_1$ to circulate in this central zone.

The external radial surface of the skirt 11 is evident at 113. The surface 113 extends the surface 122 downwards and plays a part in guiding the flow E towards a downstream region of the installation to which the wheel 1 belongs, in particular a suction conduit that is not illustrated here.

Because of the presence of the openings 121 in the wall 12, a fraction of the flow E which passes between the vanes 2 and the surfaces 31 and 41 is able to enter the volume $V_{10}$ as mentioned above, and then to flow in a direction in the main parallel to the axis $X_1$, exiting from the member 10 via the opening 14. The openings 121 thus permit a zone $Z_1$ for the passage of the flow E in the vicinity of the surfaces 122 and 113 to be placed in communication with the volume $V_{10}$.

As it leaves the member 10, the flow $E_1$ permits the filling or "stuffing" of a zone $Z_2$ close to the axis $X_1$, situated downstream of the vanes 2 of the wheel 1 and close to the lower edge 42 of the belt 4. This zone $Z_2$ is represented as a gray-shaded area in FIG. 1. As it leaves the member 10, the flow $E_1$ is guided in the main in a direction parallel to the axis $X_1$ with an azimuthal component. The zone $Z_2$ constitutes an in the main cylindrical volume having a vertical axis, in which the flow $E_1$ passes as it leaves the member 10. The flow $E_1$ makes up for a flow deficit which would exhibit a tendency to occur in the zone $Z_2$ and would be capable of generating turbulence phenomena. Since the rate of the flow $E_1$ is relatively large in relation to that of the flow E, because of the relative orientation of the axes $X_{121}$ and the straight lines $D_{31}$ in the axial sectional plane in FIG. 1, the effect of making up the turbulence phenomena in zone $Z_2$ is significant.

Taking into account its transit inside the internal volume $V_{10}$ of the member 10, especially the action of the fins 15, the flow $E_1$ exhibits a different rate from the principal flow E, which improves the effect of suppressing turbulence phenomena.

The edge 121A of each opening 121 is centered on its axis $X_{121}$ and is elongated, with its greatest dimension aligned along a straight line $D_{121}$ that is inclined in relation to the vertical, that is to say in relation to the axes $X_1$ and $X_{11}$ with the tip in its installed configuration, at an angle α equal to 20°. The angle α is selected as a function of the nominal specific speed of rotation of the wheel 1, and its value can range between −90° and 90° and preferably between −75° and −5° and between 5° and 75°.

For the purposes of the present invention, the nominal specific speed of rotation of a wheel is the speed of rotation of this wheel if it had to work under a fall of 1 meter and had to provide an output of 1 kilowatt.

In addition, the axes $X_{121}$ of the various openings 121 are divergent in relation to the axis $X_{11}$ and distance themselves from it as they approach the ceiling 13. The angle β between the projection of an angle $X_{121}$ in the plane in FIG. 1 and the axis $X_{11}$ is 45°. Its value is selected as a function of the conditions of use of the member 10, especially the specific speed of rotation of the wheel 1 and the geometry of the crown 3. This value can range between 15° and 60°.

As can be appreciated from FIG. 7, the axis $X_{121}$ of an opening 121 is not purely radial in relation to the axis $X_{11}$, but forms an angle γ of 20° with a radius $R_{121}$ passing through the center of an opening 121. The value of the angle γ may be selected, as a function of the conditions of use of the member 10, between 0° and 60°.

The fins 15 are provided for and permit changing of the path of the flow $E_1$ when this flow enters the volume $V_{10}$, while the wheel 1 is rotating. The geometry of these fins can be adapted to the conditions of use of the member 10. In particular, they are not necessarily planar or aligned on a radial plane in relation to the axis $X_{11}$ or fixed.

Once the floe $E_1$ has entered the volume $V_{10}$ through the openings 121 in wall 12, it is redirected by the fins 15, which extend for the full height of the tip 10 between the ceiling 13 and the edge 112 towards the opening 14. The path of the flow $E_1$ in the volume V10 is thus modified by the fins 15, which guide it as far as the outlet opening 14 in order to move from an orientation that is rather more centripetal to an orientation that is rather more axial.

Since the fins extend as far as the level of the opening 14, the axial height $H_{10}$ of the member 10, when observed parallel to the axis $X_{11}$, may be relatively low, to the point at which the member 10 is unable to project into the suction conduit of a Francis-type turbine equipped with the wheel 1. In practice, the edge 112 is situated above the edge 42 in the configuration for use of the wheel 1, that is to say when the axis $X_1$ is vertical and the wheel is installed as depicted in FIG. 1. The height $H_{10}$ is preferably such that the edge 112 is situated above the lower point of attachment 22 of each of the vanes 2 on the belt 4.

According to a variant of the invention that is not depicted here, the height of the skirt 11, when observed parallel to the axis $X_{11}$, can be reduced.

The sum of the areas of the entrance regions $S_{121}$ represents a significant proportion of the combined area of the surfaces 113 and 122 before completion of the openings 121, which ensures that the rate of the flow $E_1$ is sufficient to make up for the turbulence phenomena in zone $Z_2$. In practice, the sum of the areas of the regions $S_{121}$ is greater than or equal to 25%, and preferably 50%, of the combined area of the surfaces 113 and 122.

In the second embodiment of the invention depicted in FIG. 8, the elements similar to those of the first embodiment bear the same references. The member or the tip 10 of this embodiment also comprises a wall 12 provided with four openings 121 for the diversion of a flow passing through the wheel towards the internal volume $V_{10}$ of the member 10. Four fins are provided, having the same geometry and the same function as those of the first embodiment. The member 10 is equipped with four closing means 16 which are capable of rotating about the central axis $X_{11}$ of the skirt 11, as indicated by the arrows $F_{16}$ in FIG. 8, for the purpose of closing off the openings 121 totally or partially and, in so doing, of regulating the secondary flow $E_1$. The closing means 16 can be integral with one another in the vicinity of the ceiling of the member 10 and controlled so as to rotate about the axis $X_{11}$ by means of a servo motor arranged inside the volume $V_3$ of the crown of the wheel, for example by the application of a familiar technique for operating the blades of a Kaplan turbine.

Alternatively, the closing means 16 can be controlled individually.

Provision may be made in particular for the closing means 16 to close the openings 121 when the wheel 1 is functioning at its nominal speed. In fact, the formation of turbulence phenomena is normally minimized by the geometry of the vanes 2 at this speed.

As for the rest, the member 10 in this embodiment functions like that in the previous embodiment and exhibits the same advantages in particular in terms of its efficiency and axial compactness, which is due to the action of the fins 15.

In the embodiment of the invention depicted in FIGS. 9 to 12, the elements similar to those of the first embodiment bear the same references. A Francis-type turbine wheel 1 comprises vanes 2 arranged between the respective wet surfaces 31 and 41 of a crown 3 and a belt 4. The member 10 in this embodiment also comprises a ceiling 13 pierced by an opening 131 for the passage of a means of fixation on the wheel 1. The member 10 is provided with a frustoconical skirt 11 that is also convergent opposite the ceiling 13. Four fins 15, arranged at 90° around the axis of symmetry $X_{11}$ of the skirt 11, connect this skirt to the ceiling 13, maintaining a gap between the upper edge 111 of the skirt 11 and the outer radial edge 132 of the ceiling 13, which is in the form of a disk. Formed in this way is an opening 121 which extends for substantially the entire circumference of the member 10, only being interrupted every 90° by an external radial edge 151 of a fin 15, which forms a leading edge.

As in the first embodiment, the fins 15 extend as far as the level of the opening 14 for the exit of the flow $E_1$ in relation to the member 10. Each fin 15 has a trailing edge 152 that extends from the lower free edge 112 of the skirt 11 which delimits the opening 14 radially in the direction of the axis $X_{11}$, to which it is perpendicular. Each of the fins has an edge 152 parallel to the axis $X_{11}$ extending between the ceiling 13 and the edge 152.

Figure 9:
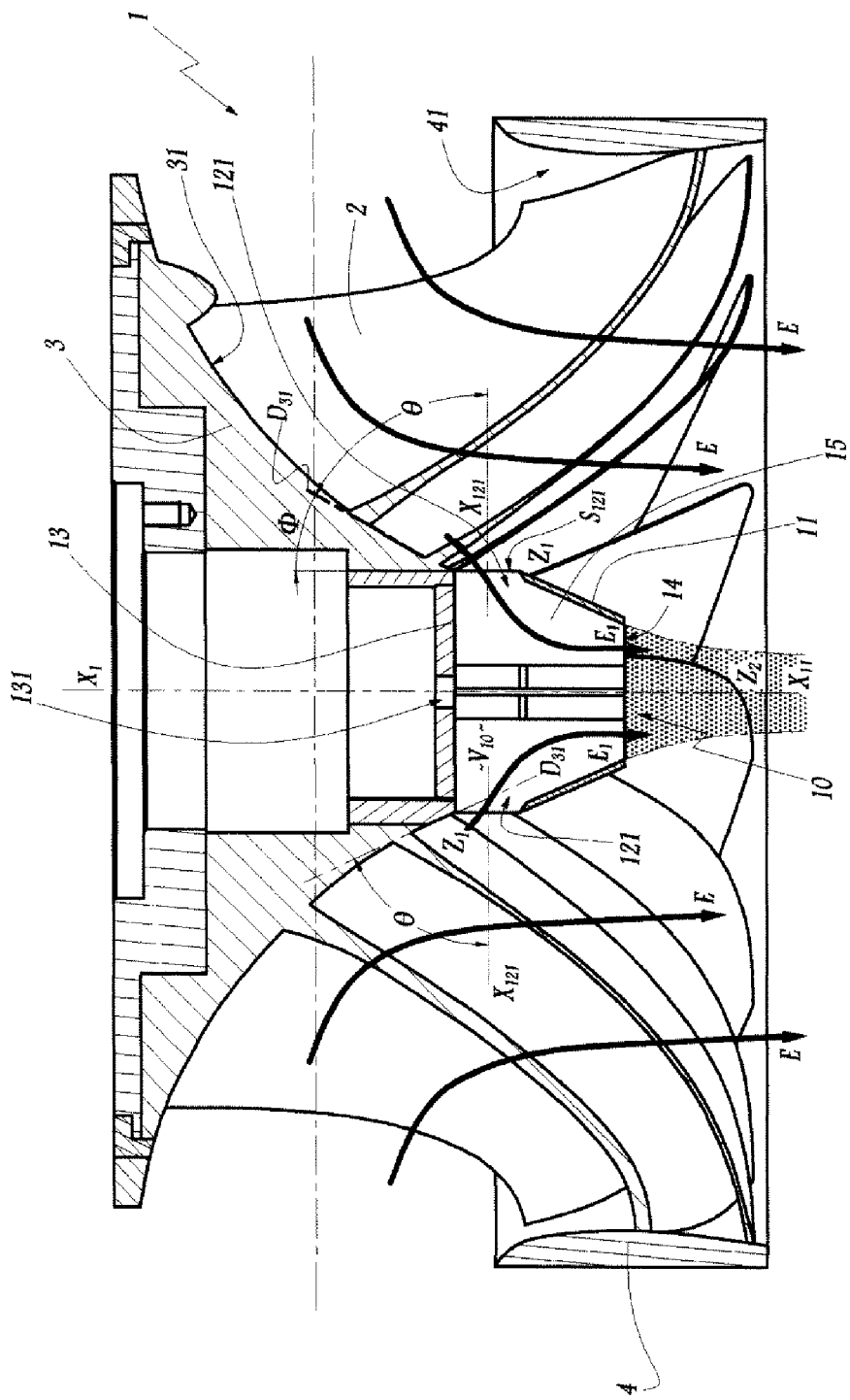
FIG. 9 is an axial section of a second turbine wheel according to the invention equipped with a tip according to a third embodiment.

As before, the entrance region of an opening 121 is evident at $S_{121}$. This entrance region is annular, except at the level of the edges 151, and its path in the plane of FIGS. 9 and 12 is coincident with the edges 151 of the fins 15. Alternatively, the region $S_{121}$ can be frustoconical.

Evident at $X_{121}$ is a central axis of one of the four portions of the opening 121 defined between two fins 15. Also evident at $D_{31}$, as in the previous embodiment, is a straight line extending the wet surface 31 in the downstream direction, that is to say in the direction of the axis $X_1$, in the axial sectional plane in FIG. 9. The angle $\theta$ between the straight line $D_{31}$ and the projection of an axis $X_{121}$ in the meridian plane in FIG. 9 is acute, with a value in the order of 70°. In practice, the value of the angle $\theta$ can be selected between 30° and 80°.

The entrance region $S_{121}$ of the opening 121 forms a non-zero angle $\phi$ with the straight line $D_{31}$.

As in the previous embodiment, the external surface of the skirt 11 is evident at 113. This surface is intended to be arranged in the main in the prolongation of the wet surface 31 of the crown 3, while being displaced downwards in relation to the latter. The opening 121 makes it possible, by its orientation which derives from the value of the angles $\theta$ and $\phi$, to control the function of a fraction $E_1$ of a flow E passing through the wheel 1 towards the internal volume $V_{10}$ of the member 10. The opening 121 thus permits a fraction of the flow E to be diverted effectively to form a secondary flow $E_1$ passing through the volume $V_{10}$. This secondary flow $E_1$ is then able to exit from the volume $V_{10}$ through an axial opening 14 delimited by the lower edge 112 of the skirt 11 so as to fill a zone equivalent to the zone $Z_2$, inside which turbulence phenomena are likely to form. The secondary flow $E_1$ is directed in the main parallel to the axis $X_1$ as it exits from the member 10. The value of the angle $\phi$ also contributes to this result.

Once the secondary flow $E_1$ has been diverted inside the volume $V_{10}$, the fins 15 act on this flow much in the same way as those of the first embodiment and cause it to be diverted in the direction of the outlet opening 14, providing it with an azimuthal component.

In this embodiment, the fins 15 are planar and are oriented in radial directions $D_{15}$ in relation to the axis $X_{11}$ in the plane of FIG. 11. However, they may have other geometries and other orientations.

In this embodiment, the fins 15 connect the skirt 11 and the ceiling 13 without resorting to the use of a wall such as the wall 12 in the first embodiment. In addition to their function of diverting the secondary flow $E_1$, the fins 15 play the role of linking arms between the parts 11 and 13 of the member 10.

According to a variant of the invention, not illustrated here, the height $H_{121}$ of the opening 121, when observed parallel to the axis of symmetry $X_{11}$ of the skirt 11 which is coincident with the axis $X_1$ and with the member 10 in its installed configuration, is variable as a function of the operating point of the turbine. The distance between the upper edge 111 of the skirt 11 and the edge 132 of the ceiling 13 can thus be adjusted by a servo motor of the same type as those used to regulate the blades of a Kaplan turbine.

The area of the region $S_{121}$ is approximately equal to $$2 \times \pi \times R_{111} \times H_{121}$$

where $R_{111}$ is the radius of the edge 111. This area represents approximately 50% of the area of the external surface 113 of the skirt 11, this percentage being variable as required if the height $H_{121}$ is adjustable. This percentage lies between 20% and 80% as a function of the design choices for the member 10.

According to another aspect of the invention, as illustrated in FIG. 13, and which concerns all the embodiments, provision can be made for one of the fins 15 or a plurality thereof to be movable in relation to the skirt 111. This permits their action to be adapted to the flow $E_1$ at the operating point of the wheel 1.

Whatever embodiment is being considered, the number of fins 15 may be selected as a function of the conditions of use of the tip 10. This can be equal to one and less than or greater than four.

According to another variant of the invention, not illustrated here, that is applicable to all the embodiments, the fins 15 can be contiguous in the central portion of the internal volume $V_{10}$ of the member 10. In other words the fins can touch one another, and their edges 153 are then coincident. In this case, they form parallel channels for the circulation of the secondary flow $E_1$ towards the opening 14.

The technical characteristics of the various embodiments referred to above can be combined together.

A member according to the invention can be mounted on a wheel equipping a turbine pump. When used in pump mode, the flow takes place in the opposite direction from that represented by the arrows E and $E_1$ in the figures, and it is important to be able to close off the openings 121 when the wheel is optimal operating condition, as explained with reference to the second embodiment.

The invention has been represented by members 10 provided with a ceiling 13 for mounting on a wheel 1. A ceiling of this kind is not mandatory and can be replaced by other linking parts on the crown or on the hub of the wheel, for example a flange, whether open or not.

The invention has been represented by a member 10 bolted to the crown 3 of a wheel. Such a member may be attached to the wheel by different means, for example by welding.

The invention has been represented by a member 10 intended to be attached to the crown of a wheel 1. It is also applicable in the case where a tip-forming member is an integral part of the wheel 1, being integral with the crown 3 that it extends.

Finally, the invention can be combined with the technical account in WO-A-2005/038243.

The invention is also applicable to wheels of the propeller type which can be regarded as special Francis-type wheels without a belt and in which the vanes rotate in relation to a fixed casing.

The invention claimed is:

1. A Francis wheel for a turbine or a hydraulic turbine pump, the wheel comprising:
    a plurality of vanes arranged on a crown and having a tip-forming member attached to a central region of the crown radially inside the vanes, the crown defining a wet surface for guiding a flow passing between the vanes, the tip-forming member having a radial wall defining an internal volume, the radial wall being provided with at least one opening for diverting a fraction of the flow passing between the vanes towards the internal volume of the tip-forming member, the tip-forming member including a frustoconical annular skirt which encloses the internal volume of the tip-forming member and towards which the fraction of the flow is diverted, and in that at least one fin is arranged inside the internal volume of the tip-forming member and extends as far as an edge of the skirt delimiting an outlet opening from the tip-forming member for the fraction of the flow that is diverted towards the internal volume, the at least one fin modifies a flow path of the fraction of the flow within the internal volume to direct the fraction of the flow through the outlet opening;
    a plurality of spaced openings in the tip-forming member for diverting a fraction of the flow and wherein a sum of areas of entrance regions into the plurality of openings for diverting the flow is greater than or equal to 25% of an area of an external surface of the tip-forming member; and
    wherein the at least one fin is provided with a trailing edge that extends from the edge of the skirt delimiting the outlet opening in a direction of an axis of rotation of the wheel and which is perpendicular to the axis of rotation.

2. The wheel as claimed in claim 1, wherein the edge of the skirt is positioned above the lower edge of a belt of the wheel, and above lower points of attachment of the vanes on the belt.

3. The wheel as claimed in claim 1, including a plurality of equally spaced fins for modifying the flow of the fraction of the flow in the internal volume of the tip-forming member.

4. The wheel as claimed in claim 1, wherein the at least one fin is provided with a free edge that is essentially parallel to an axis of rotation of the wheel.

5. The wheel as claimed in claim 3, wherein the plurality of fins are contiguous in a central portion of the internal volume of the tip-forming member.

6. The wheel as claimed in claim 1, wherein a projection, in a meridian plane in relation to an axis of rotation of the wheel, of a central axis of the at least one opening for diverting the fraction of the flow forms an acute angle with a straight line extending the wet surface of the crown in a downstream direction in a common plane as and in a direction of the axis of rotation of the wheel.

7. The wheel as claimed in claim 6, wherein the acute angle between the central axis and the straight line is less than 80°.

8. The wheel as claimed in claim 6, wherein the acute angle between the central axis and the straight line is less than 60°.

9. The wheel as claimed in claim 1, wherein the at least one fin connects the skirt to a ceiling part of the tip-forming member linking the tip-forming member to the crown of the wheel.

10. The wheel as claimed in claim 1, wherein the at least one fin extends in a radial direction relative to a central axis of the skirt.

11. The wheel as claimed in claim 1, including at least one movable flow restrictor configured to selectively close the at least one opening for diverting a fraction of the flow.

12. The wheel as claimed in claim 1, that wherein the at least one opening for diverting a fraction of the flow is formed in a cylindrical or frustoconical portion of the radial wall of the tip-forming member.

13. The wheel as claimed in claim 1, that wherein the at least one opening for diverting a fraction of the flow is elongated, having a greatest dimension inclined at an angle (a) ranging between −90° and 90° in relation to a central axis of the tip-forming member.

14. The wheel as claimed in claim 1, wherein the at least one opening for diverting a fraction of the flow is elongated, having a greatest dimension inclined at an angle (a) ranging between −75° and −5° or between 5° and 75° in relation to a central axis of the tip-forming member.

15. The wheel as claimed in claim 1, that wherein the at least one opening for diverting a fraction of the flow extends for substantially an entire circumference of the tip-forming member between the skirt and a ceiling part linking the tip-forming member with the crown of the wheel.

16. The wheel as claimed in claim 15, a position of the skirt in relation to the crown of the wheel is adjustable vertically.

17. A method of reducing fluctuations in a flow interacting with a wheel of a hydraulic machine, comprising steps of causing a fraction of the flow to penetrate into the internal volume of a tip-forming member belonging to a wheel, as claimed in claim 1, through the at least one opening for diverting the flow, modifying a path of the flow using the at least one fin within the tip-forming member, and directing the fraction of the flow to exit from the tip-forming member through an axial opening in such a way that fraction of the flow is directed as it exits from the tip-forming along an axis parallel to an axis of rotation of the wheel.

18. A Francis wheel for a turbine or a hydraulic turbine pump, the wheel comprising:
   a plurality of vanes arranged on a crown and having a tip-forming member attached to a central region of the crown radially inside the vanes, the crown defining a wet surface for guiding a flow passing between the vanes, the tip-forming member having a radial wall defining an internal volume, the radial wall being provided with at least one opening for diverting a fraction of the flow passing between the vanes towards the internal volume of the tip-forming member, the tip-forming member including a frustoconical annular skirt which encloses the internal volume of the tip-forming member and towards which the fraction of the flow is diverted, and in that at least one fin is arranged inside the internal volume of the tip-forming member and extends as far as an edge of the skirt delimiting an outlet opening from the tip-forming member for the fraction of the flow that is diverted towards the internal volume, the at least one fin modifies a flow path of the fraction of the flow within the internal volume to direct the fraction of the flow through the outlet opening;
   a plurality of spaced openings in the tip-forming member for diverting a fraction of the flow and wherein a sum of areas of entrance regions into the plurality of openings for diverting the flow is greater than or equal to 25% of an area of an external surface of the tip-forming member; and
   wherein a vertical position of the tip-forming member in relationship to the crown is fixed.

19. A method of reducing fluctuations in a flow interacting with a wheel of a hydraulic machine, comprising steps of:
   causing a fraction of the flow to penetrate into the internal volume of a tip-forming member belonging to a Francis wheel for a turbine or a hydraulic turbine pump, the wheel including a plurality of vanes arranged on a crown and having a tip-forming member attached to a central region of the crown radially inside the vanes, the crown defining a wet surface for guiding a flow passing between the vanes, the tip-forming member having a radial wall defining an internal volume, the radial wall being provided with at least one opening for diverting a fraction of the flow passing between the vanes towards the internal volume of the tip-forming member, the tip-forming member including a frustoconical annular skirt which encloses the internal volume of the tip-forming member and towards which the fraction of the flow is diverted, and in that at least one fin is arranged inside the internal volume of the tip-forming member and extends as far as an edge of the skirt delimiting an outlet opening from the tip-forming member for the fraction of the flow that is diverted towards the internal volume, the at least one fin modifies a flow path of the fraction of the flow within the internal volume to direct the fraction of the flow through the outlet opening, and a plurality of spaced openings in the tip-forming member for diverting a fraction of the flow and wherein a sum of areas of entrance regions into the plurality of openings for diverting the flow is greater than or equal to 25% of an area of an external surface of the tip-forming member;
   diverting the flow through the at least one opening;
   modifying a path of the flow using the at least one fin within the tip-forming member;
   directing the fraction of the flow to exit from the tip-forming member through an axial opening in such a way that fraction of the flow is directed as it exits from the tip-forming along an axis parallel to an axis of rotation of the wheel; and
   fixing the tip-forming member in a vertical relationship to the crown.

* * * * *